Oct. 16, 1951  N. F. ANDREWS  2,571,811
HARVESTER GATHERER
Filed June 9, 1947
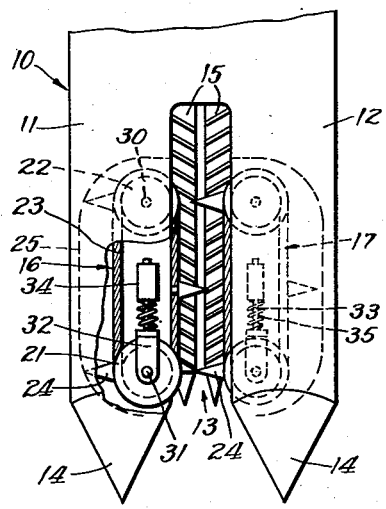
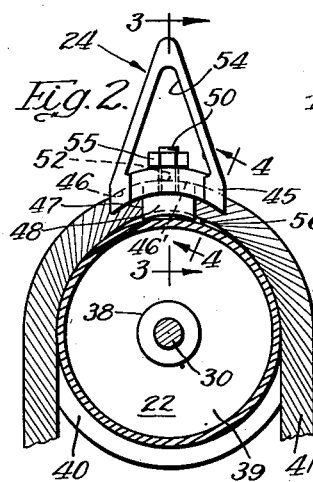
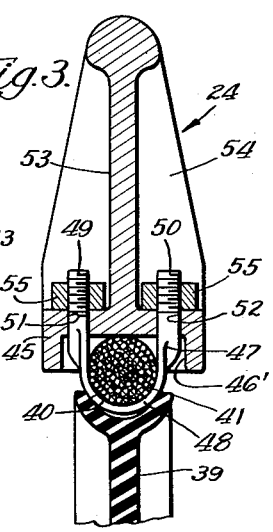
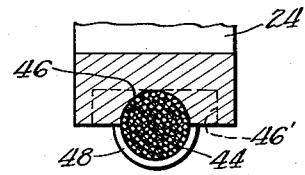
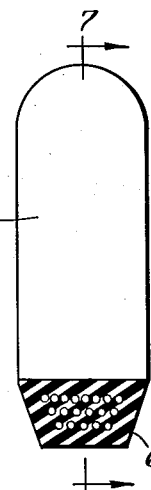
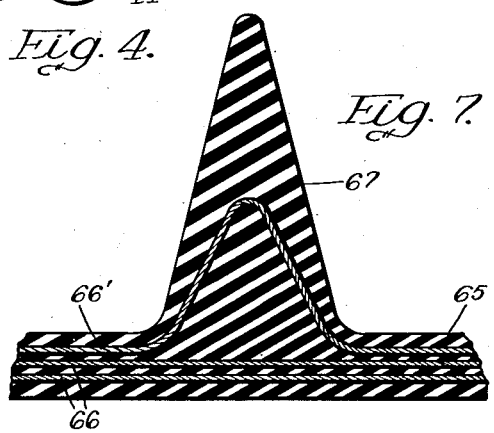
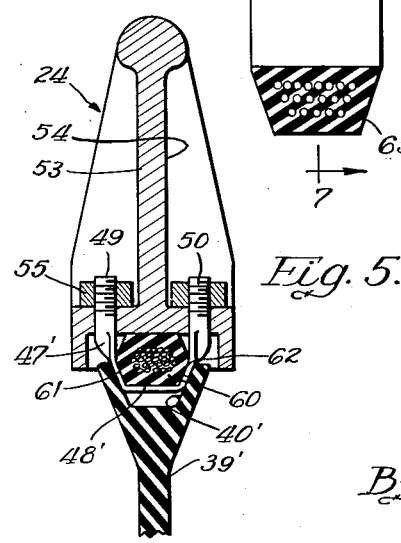
Inventor:
Norman F. Andrews,
By  Attys.

Patented Oct. 16, 1951

2,571,811

UNITED STATES PATENT OFFICE 2,571,811

HARVESTER GATHERER

Norman F. Andrews, Moline, Ill., assignor to Deere & Company, Moline, Ill., a corporation of Illinois Application June 9, 1947, Serial No. 753,437

4 Claims. (Cl. 198—162)

The present invention relates generally to corn harvesters and the like and more particularly to the harvester gatherers which gather stalks from a row and feed them rearwardly into the machine for purposes well known to those skilled in the art. Heretofore, as far as applicant is aware, the gathering and feeding mechanism has consisted of one or more chains trained around a pair of fore and aft spaced sprockets, the chains having a plurality of laterally extending stalk engageable lugs spaced longitudinally thereon.

One of the principal objects of my invention relates to the provision of gatherer mechanism which is stronger and more durable than the conventional gatherer chains, and which is quieter and smoother in operation.

These and other objects and advantages of my invention will be apparent to those skilled in the art after a consideration of the following description in which reference is had to the drawings appended hereto, in which Figure 1 is a top plan view of a corn harvester embodying the principles of my invention;

Figure 2 is a fragmentary plan view drawn to a larger scale showing one of the pulleys and a portion of a gatherer element trained around the latter;

Figure 3 is an enlarged sectional view taken along a line 3—3 in Figure 2;

Figure 4 is a sectional view taken along a line 4—4 in Figure 2, and drawn to a larger scale;

Figure 5 is a sectional view similar to Figure 3 but showing a modified form of my invention;

Figure 6 is a transverse sectional view taken through another modified gatherer element; and Figure 7 is a longitudinal sectional view taken along a line 7—7 in Figure 6.

Referring now to the drawings, the harvester gatherer unit is indicated in its entirety by reference numeral 10 and comprises a conventional pair of sheet metal gatherer arms or shields 11, 12 spaced laterally to provide a longitudinally extending stalk passage 13 therebetween. Each of the arms 11, 12 is provided with a forwardly extending gatherer point 14 for raising the fallen stalks and guiding them into the passage 13 in a manner well known to those skilled in the art. A pair of conventional snapping rolls 15 are disposed in parallel arrangement within the passage 13 and are adapted to receive therebetween the stalks, from which they snap the ears in the usual manner. A pair of stalk moving devices 16, 17 are mounted on the two gatherer arms 11, 12, respectively, for moving the stalks rearwardly in the passage 13 between the snapping rolls 15. Each of the stalk moving devices comprises a pair of fore and aft spaced pulleys or sheaves 21, 22, around which is trained a flexible endless member 23 having a plurality of outwardly projecting stalk engageable lugs 24 secured thereto. Each of the stalk moving devices is located to provide an inner flight of the flexible endless member 23 which extends along one side of the passage 13 above the associated snapping roll, which inner flight is driven rearwardly with the lugs 24 projecting inwardly of the passage 13 to engage the stalks therein. The outer flight of each of the endless members 23 moves forwardly beneath the sheet metal shield, the lugs 24 sliding forwardly on a shelf 25, which is mounted on the associated gatherer arm beneath the respective pair of sheaves 21, 22.

Each of the rear sheaves 22 is mounted on a drive shaft 30, which is journaled in suitable bearings (not shown) on the gatherer arm and which is driven by any suitable power transmitting mechanism (not shown). The forward sheave is provided with a shaft 31 which is journaled in a fork 32 mounted on a rearwardly extending rod 33, which extends into a supporting sleeve 34 mounted on the shelf 25. A compression spring 35 is coiled about the rod 33 between the sleeve 34 and the fork 32 and urges the front sheave 21 forwardly to tighten the flexible endless member 23.

Inasmuch as the present invention is not concerned with the details of construction of the harvester, the foregoing description is considered sufficient.

Coming now to that portion of the structure with which my invention is more particularly concerned, each of the sheaves 21, 22 is in the form of a wheel having a hub 38 and a disk or web 39 formed with a peripheral groove 40. In the embodiment of my invention shown in Figures 2 and 3, the groove 40 is substantially semi-circular in cross section and is adapted to receive the flexible endless member 23, which in this embodiment is in the form of a metal stranded cable 41 of substantially circular cross section, although other material, such as rubber, might be used. In order to maintain maximum traction of the pulley on the cable consistent with quiet operation, the pulley or sheave can be made of molded hard rubber for use with the metal cable, while the sheave can be made of metal for use with a rubber cable or belt.

Each of the stalk engageable lugs 24 is generally triangular in shape and is preferably made of cast metal or molded hard rubber. The lug 24 tapers outwardly and is provided with a base or cable-proximate portion 45 which is provided with a longitudinal arcuate groove or recess 46 therein adapted to receive the cable 41. Each lug is secured to the cable by means of a U-shaped clamping element 47 comprising a relatively thin band portion 48 embracing the inner half of the cable 41 and a pair of cylindrical threaded end portions 49, 50, inserted through apertures 51, 52 in the base portion 45. The threaded ends 49, 50 extend through the apertures 51, 52 into a pair of recesses 53, 54 in the relatively opposite sides of the lug 24, respectively. Nuts 55 are screwed onto the threaded ends 49, 50 to draw the clamping member 47 tightly against the cable 41 to secure the lug thereto.

The cable fits snugly within the arcuate groove 46 at each end of the latter (see Figure 4) but the groove 46 is enlarged at 46' in the center of the lug 24 to receive the clamping element 47. It is apparent in Figure 2 that the radius of curvature of the arcuate groove 46 is appreciably shorter than the radius of curvature of the periphery of the cable 41. As will further appear in Figure 2, the length of the band 48 is relatively short as compared to the groove or recess 46 and is of convex shape to cause the cable to kink slightly and seat in the concavity provided at 46'. This provides a space 56 between the inner surface of the cable and the base circle of the groove 46 to accommodate the band portion 48 of the clamp, while permitting the adjacent portions of the cable to lie snugly in the groove 46. This causes the cable to run more smoothly around the pulleys, for the clamps 47 do not increase the tension in the cable as they pass around each of the pulleys or sheaves.

Referring now to the embodiment shown in Figure 5, the flexible endless member 60 comprises a fabric and rubber composition belt of a conventional hexagonal type, having a pair of inwardly converging driving surfaces 61 adapted to contact inner opposed conical surfaces 62 of a peripheral groove 40' formed in a sheave or wheel 39'. In this embodiment, a band portion 48' of a clamp 47' is bent in a shape which conforms with the shape of the belt 60.

Referring now to the third embodiment shown in Figures 6 and 7, the flexible endless member 65 is in the form of a conventional V-belt of rubber and fabric construction, the fabric comprising several layers of non-extensible cords 66 embedded therein. Each of the lugs 67 is integrally formed with the belt of molded rubber and is stiffened by looping the outer layer 66' of cords outwardly into the molded body of the lug 67.

This type of belt with integrally formed rubber lugs has the advantage of extreme quietness and smoothness in operation, and may be used with a pair of metal sheaves.

I claim:

1. For a harvester gatherer having a pair of spaced apart, peripherally grooved sheaves: an endless belt of flexible and deformable material adapted to be trained about the sheaves and having bottom and opposite side portions receivable in the grooves of the sheaves and a top portion exposed outwardly of the sheaves; a plurality of material-engaging lugs spaced along the top portion of the belt and having a concave seat on an arc lengthwise of the belt and seating on said top portion; and a connector element secured to each lug and embracing the belt, each connector element including a pair of side parts spaced transversely of the belt and extending from said seating portion inwardly respectively along said side portions of the belt, and means connected to said side parts and extending crosswise of the bottom portion of the belt and deforming the belt for cooperation with the concave seat to secure the lug to the belt.

2. The invention defined in claim 1, further characterized in that: the belt in cross-section is of polygonal shape; and the side parts and bottom means of the connector element are shaped to conform to said polygonal shape of the belt.

3. For a harvester gatherer having a pair of sheaves spaced apart and rotatable on generally parallel axes and respectively having peripheral grooves therein lying substantially in a common plane: a flexible endless member having an inner groove-engaging portion continuous lengthwise thereof and an outer lug-receiving portion continuous lengthwise thereof, said member adapted to be trained about the sheaves for seating of said inner portion in the sheave grooves; a plurality of material-engaging lugs spaced along and projecting outwardly from the outer portion of the member, each lug having an inner seating surface disposed lengthwise of the member and arcuately recessed from end to end on a radius shorter than the radius of the base circle of either sheave, said surface receiving the proximate part of the outer portion of the member; a plurality of clamping elements, one for each lug and securable thereto with the proximate part of the flexible member therebetween, each element having an outer convex portion engaging said proximate part of the flexible member to conform it to the lug recess, said convex portion being relatively short as compared with the length of the lug recess to cause the lug-carrying parts of the flexible member to hug the sheaves when passing around the sheaves; and a plurality of means for respectively securing the lugs and clamping elements together.

4. For a harvester gatherer having a pair of sheaves spaced apart and rotatable on generally parallel axes and respectively having peripheral grooves therein lying substantially in a common plane and a flexible endless member having an inner groove-engaging portion continuous lengthwise thereof and an outer lug-receiving portion continuous lengthwise thereof, said member adapted to be trained about the sheaves for seating of said inner portion in the sheave grooves: a material-engaging lug for mounting on and to project outwardly from the outer portion of the member and having an inner seating surface disposed lengthwise of the member and arcuately recessed from end to end to receive the proximate part of the outer portion of the member; a clamping element securable to the lug with the proximate part of the flexible member therebetween and having an outer convex portion engaging said proximate part of the flexible member to conform it to the lug recess, said convex portion being relatively short as compared with the length of the lug recess to cause the lug-carrying part of the flexible member to hug the sheaves when passing around the sheaves; and means for securing the lug and clamping element together.

NORMAN F. ANDREWS.

REFERENCES CITED

The following references are of record in the file of this patent:

UNITED STATES PATENTS

| Number | Name | Date |
|---|---|---|
| 503,908 | Hahn | Aug. 22, 1893 |
| 509,251 | Sheldrick | Nov. 21, 1893 |
| 516,698 | Bliss | Mar. 20, 1894 |
| 1,734,972 | Johnson | Nov. 12, 1929 |
| 2,480,209 | Aasland | Aug. 30, 1949 |

FOREIGN PATENTS

| Number | Country | Date |
|---|---|---|
| 135,619 | Switzerland | Dec. 2, 1929 |